United States Patent
Xin et al.

(10) Patent No.: US 8,754,606 B2
(45) Date of Patent: Jun. 17, 2014

(54) POWER SUPPLY CIRCUIT AND MOTOR DEVICE

(75) Inventors: Fei Xin, Shenzhen (CN); En Hui Wang, Shenzhen (CN); Chi Ping Sun, Hong Kong (CN); Ming Li Zhang, Shenzhen (CN); Shing Hin Yeung, Hong Kong (CN)

(73) Assignee: Johnson Electric S.A., Murten (CH)

( * ) Notice: Subject to any disclaimer, the term of this patent is extended or adjusted under 35 U.S.C. 154(b) by 588 days.

(21) Appl. No.: 13/072,178

(22) Filed: Mar. 25, 2011

(65) Prior Publication Data
US 2011/0234128 A1 Sep. 29, 2011

(30) Foreign Application Priority Data

Mar. 26, 2010 (CN) .......................... 2010 1 0138043
Aug. 24, 2010 (CN) .......................... 2010 1 0270600

(51) Int. Cl.
*H02P 3/18* (2006.01)

(52) U.S. Cl.
USPC .......................... 318/814; 318/817; 318/729

(58) Field of Classification Search
USPC ................ 318/814, 817, 729, 749, 750, 816; 307/109
See application file for complete search history.

(56) References Cited

U.S. PATENT DOCUMENTS

| | | | |
|---|---|---|---|
| 4,751,451 A | 6/1988 | Vincent | |
| 6,608,405 B1 | 8/2003 | Zakharian | |
| 7,102,326 B1 | 9/2006 | Chen et al. | |
| 2011/0235218 A1* | 9/2011 | Wang et al. | 361/15 |
| 2013/0003252 A1* | 1/2013 | Stockman | 361/275.2 |

FOREIGN PATENT DOCUMENTS

EP 0974482 B1 8/2003

* cited by examiner

*Primary Examiner* — Karen Masih
(74) *Attorney, Agent, or Firm* — Muncy, Geissler, Olds & Lowe, P.C.

(57) ABSTRACT

A power supply circuit has an input terminal for electrically connecting to an active wire of an AC power supply, an earth terminal for electrically connecting to a neutral or ground wire of the AC power supply, and a voltage decreasing unit. The voltage decreasing unit has an adjustable capacitor unit with adjustable capacitance for decreasing an AC voltage applied to the input terminal and an output terminal for outputting the decreased AC voltage. An electric motor is combined with the power supply circuit to form a motor device.

12 Claims, 5 Drawing Sheets

POWER SUPPLY CIRCUIT AND MOTOR DEVICE

CROSS REFERENCE TO RELATED APPLICATIONS

This non-provisional patent application claims priority under 35 U.S.C. §119(a) from Patent Application No. 201010138043.8 filed in The People's Republic of China on Mar. 26, 2010 and Patent Application No. 201010270600.1 filed in The People's Republic of China on Aug. 24, 2010.

FIELD OF THE INVENTION

The invention relates to a power supply circuit which is particularly suitable for powering an electric motor and to a motor device incorporating same.

BACKGROUND OF THE INVENTION

A driver for a BLDC motor usually includes a voltage decreasing unit for decreasing AC mains voltage, a rectifier for rectifying the decreased AC voltage to a DC voltage, and an inverter which is powered by the DC voltage and commutates the power supplied to the BLDC motor. In prior art drivers, the speed of the motor can be adjusted by changing the PWM signal provided to the inverter.

The present invention aims to provide a new power supply circuit which is particularly suitable for a variable speed electric motor powered by an AC mains power supply.

SUMMARY OF THE INVENTION

Accordingly, in one aspect thereof, the present invention provides a power supply circuit comprising an input terminal for electrically connecting to an active wire of an AC power supply, an earth terminal for electrically connecting to a neutral or ground wire of the AC power supply, and a voltage decreasing unit, wherein the voltage decreasing unit comprises: an adjustable capacitor unit with adjustable capacitance for decreasing an AC voltage applied to the input terminal; and an output terminal for outputting the decreased AC voltage.

Preferably, the adjustable capacitor unit is electrically connected between the input terminal and the output terminal.

Preferably, the voltage decreasing unit further comprises a fixed capacitor electrically connected between the output terminal and the earth terminal.

Alternatively, the adjustable capacitor unit is electrically connected between the output terminal and the earth terminal, and the voltage decreasing unit further comprises a fixed capacitor electrically connected between the input terminal and the output terminal.

Preferably, the voltage decreasing unit comprises a first adjustable capacitor unit electrically connected between the input terminal and the output terminal and a second adjustable capacitor unit electrically connected between the output terminal and the earth terminal.

Preferably, the adjustable capacitor unit comprises at least two fixed capacitors and a control unit for respectively and controllably electrically connecting the at least two fixed capacitors between the input terminal and the output terminal.

Preferably, the adjustable capacitor unit comprises at least one switching capacitor which comprises a fixed capacitor and a switch electrically connected in series with the fixed capacitor.

Preferably, the adjustable capacitor unit comprises at least two switching capacitors which are electrically connected in parallel with each other.

Optionally, each switching capacitor further comprises a resistor electrically connected in series with the fixed capacitor.

Preferably, the voltage decreasing unit further comprises a resistor electrically connected in parallel with the adjustable capacitor unit.

Preferably, the voltage decreasing unit further comprises a resistor and/or an inductor electrically connected in series with the adjustable capacitor unit.

According to a second aspect, the present invention provides a motor device comprising a motor and a power supply circuit for powering the motor, wherein the power supply circuit is as described above.

Preferably, the motor is a DC motor, and the power supply circuit further comprises an A-D converter for converting the decreased AC voltage of the output terminal to a DC voltage.

Preferably, the A-D converter is arranged on a printed circuit board, and the voltage decreasing unit is electrically connected with the printed circuit board but mechanically independent from the printed circuit board.

Alternatively, the motor is an AC motor powered by the decreased AC voltage from the output terminal.

In the embodiments of the present invention, by adjusting the capacitance of the adjustable capacitor unit, the voltage output from the voltage decreasing unit can be adjusted to change the speed of the motor. Meanwhile, the circuit of the motor driver is simple and the cost is reduced.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
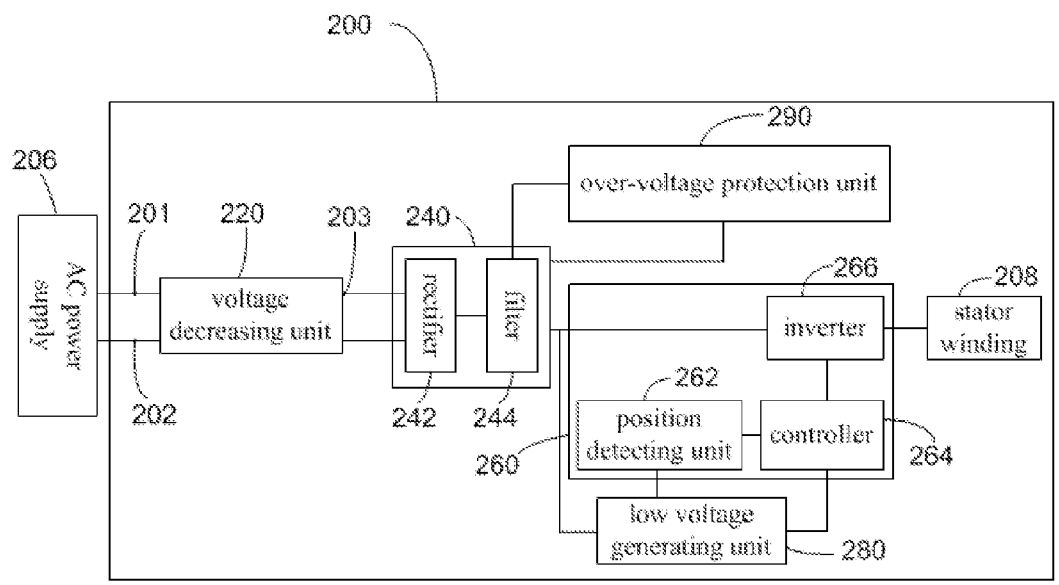
FIG. 1 is a block diagram of a motor device in accordance with a first embodiment of the present invention.
Figure 2:
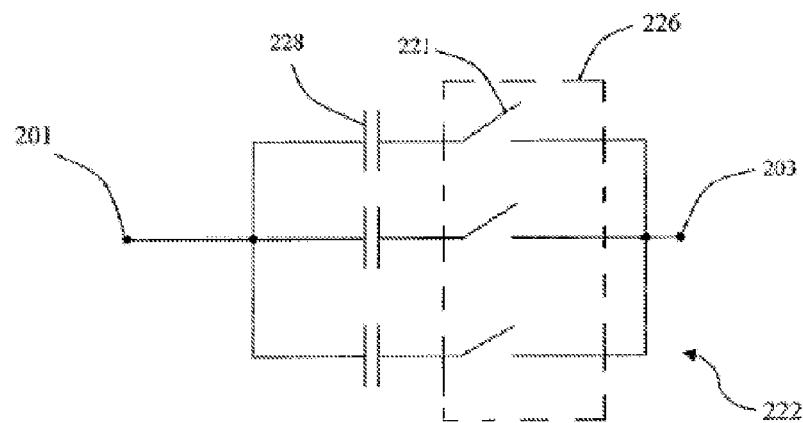
FIG. 2 is a schematic diagram of a voltage decreasing unit of the motor device of FIG. 1.

Referring to FIGS. 1 and 2, a motor device 200 according to the preferred embodiment of the present invention is powered by an alternating current (AC) power supply 206 and comprises a motor and a power supply circuit for supplying power to the motor. The power supply circuit comprises an input terminal 201 for connecting a live or active wire of the AC power supply 206, an earth terminal 202 for connecting a neutral or ground wire of the AC power supply 206, a voltage decreasing unit 220, and an A-D converter 240. In this embodiment, the motor is a brushless direct current (BLDC) motor having a rotor and a stator with a stator winding 208.

The voltage decreasing unit 220 comprises an adjustable capacitor unit 222 (FIG. 2) with adjustable capacitance for decreasing the AC voltage supplied to the input terminal 201 and the earth terminal 202. The decreased voltage is applied to an output terminal 203 of the voltage decreasing unit. The adjustable capacitor unit 222 is electrically connected between the input terminal 201 and the output terminal 203 and comprises at least two fixed capacitors 228 with fixed capacitance and a control unit 226 for controlling connection of the at least two fixed capacitors 228 between the input terminal 201 and the output terminal 203. The control unit 226 comprises at least two switches 221 which are respectively electrically connected in series with the at least two fixed capacitors 228. Each switch 221 and a corresponding capacitor 228 form a switching capacitor and the at least two switching capacitors are electrically connected in parallel with each other. When a switch 221 is conductive, its corresponding capacitor 228 is electrically connected between the input terminal 201 and the output terminal 203, in effect connecting the power supply to the output terminal 203. When a switch 221 is non-conductive or open circuited, its corresponding capacitor 228 is electrically disconnected from the circuit. Therefore, by controlling the states of the respective switches 221, the fixed capacitors 228 can be electrically connected or disconnected from the circuit so that the capacitance of the adjustable capacitor unit 222 can be adjusted, thereby adjusting the output voltage of the voltage decreasing unit.

The A-D converter 240 comprises a rectifier 242 for converting the decreased AC voltage at the output terminal 203 to a DC voltage and a filter 244 for smoothing the DC voltage output from the rectifier 242. In the preferred embodiment, the rectifier 242 is a bridge rectifier and the filter 244 is a capacitor electrically connected across the output terminals of the bridge rectifier.

A D-D converter powered by the DC voltage output from the A-D converter 240 can also be arranged in the motor device 200. In the embodiment, the D-D converter is a low-voltage generating unit 280 for generating a stable lower DC voltage from the higher DC voltage output from the A-D converter 240. The low-voltage generating unit 280 comprises a resistor and a Zener diode. One end of the resistor is electrically connected with the positive output terminal of the bridge rectifier, the other end is electrically connected with the cathode of the Zener diode, and the anode of the Zener diode is electrically connected with the ground. Optionally, a filtering capacitor electrically connected in parallel with the Zener diode may be arranged in the low-voltage generating unit 280 so as to output a stable lower DC voltage at the cathode of the Zener diode.

The motor device 200 further includes a driving unit 260 which comprises a position detecting unit 262, a controller 264 and an inverter 266. The position detecting unit 262 may be a Hall sensor which is powered by the lower DC voltage and arranged to detect the position of the rotor of the BLDC motor and output a corresponding position signal. The controller 264 is configured to respond to the position signal and output a corresponding commutating signal. The controller 264 can be realized by a microcontroller or by a switching circuit constituted by electronic components such as resistor and switch. The inverter 266 is powered by the DC voltage output from the A-D converter 240 and is configured to respond to the commutating signal to supply power to the stator windings 208 of the motor.

In addition, the motor device 200 further includes a voltage adjusting unit for adjusting the DC voltage output from the A-D converter 240. In the preferred embodiment, the voltage adjusting unit is an over-voltage protection unit 290 arranged to limit the maximum voltage output from the A-D converter 240 to prevent electronic components powered by the DC voltage from damage. Besides, as electronic components with a relatively lower voltage-resistant grade could be used in the circuit powered by the AC voltage output from the voltage decreasing unit, the circuit cost could be lowered.

In the embodiments of the present invention, by controlling the adjustable capacitor unit 222 with different capacitances, the A-D converter 240 can correspondingly output DC voltage with different values so as to operate the motor at different speeds. If the adjustable capacitor unit 222 has n fixed capacitors 228 which have different capacitances from one another, up to $2^n-1$ different speeds can be provided.

Figure 3:
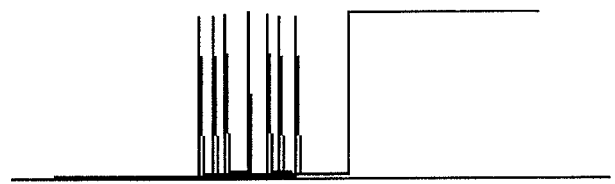
FIG. 3 shows a high frequency pulse signal output from a mechanical switch between an AC power supply and the voltage decreasing unit.
Figure 4:
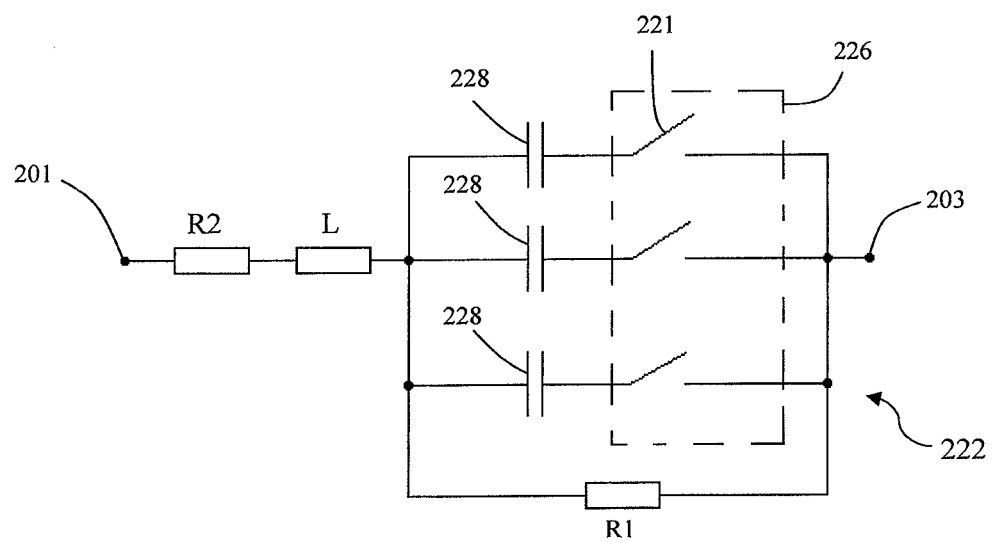
FIGS. 4 to 10 respectively show voltage decreasing units according to further embodiments of the present invention.

In practical applications, a mechanical switch may be provided for connecting the AC power supply 206 to the input terminal. During switching, the mechanical switch is prone to bouncing thereby outputting a high frequency pulse signal as shown in FIG. 3. At this time, the capacitor 228 in the adjustable capacitor unit 222 is equivalent to a short circuit path, which results in a surge current passing through the capacitor and the following electronic components. To solve this problem, compared with the voltage decreasing unit 220 of FIG. 2, a voltage decreasing unit 220, in accordance with a second embodiment as shown in FIG. 4, further comprises a resistor R2 and an inductor L which are electrically connected in series with the adjustable capacitor unit 222 to limit the possible surge current to prevent the electronic components from damage and a resistor R1 which is electrically connected in parallel with the adjustable capacitor unit 222 for discharging the adjustable capacitor unit 222 after the AC power supply is disconnected from the power supply circuit. It should be understood that in different applications the voltage decreasing unit 220 could include any one, any two or all three of the resistors R1, R2 and the inductor L, depending on practical requirements.

Figure 5:
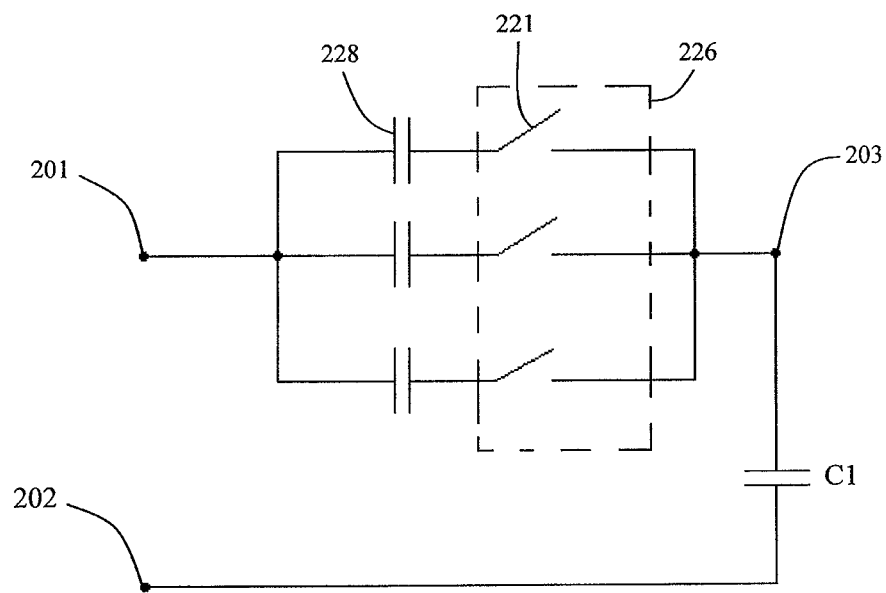

Compared with the voltage decreasing unit 220 shown in FIG. 2, a voltage decreasing unit 220 in accordance with a third embodiment, as shown in FIG. 5, further comprises a capacitor C1 electrically connected between the output terminal 203 and the earth terminal 202.

Figure 6:
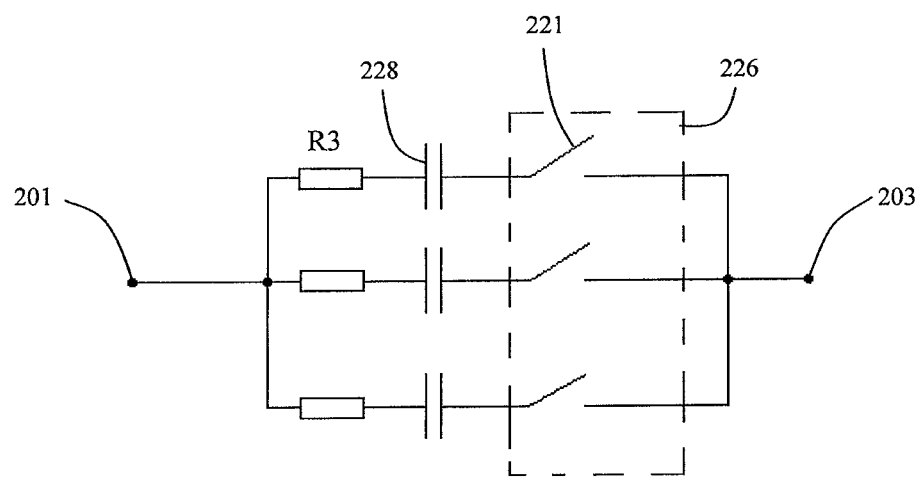

Compared with the voltage decreasing unit 220 shown in FIG. 2, in a voltage decreasing unit 220 in accordance with a fourth embodiment, as shown in FIG. 6, a respective resistor R3 is electrically connected in series with each fixed capacitor 228 such that each switching capacitor has its own resistor R3 to limit the possible surge current and make the output of the voltage decreasing unit 220 more accurate. It should be understood that discharging resistor R1 electrically connected in parallel with the adjustable capacitor unit 222 and/or inductor L electrically connected in series with the adjustable capacitor unit 222 can also be arranged, depending on practical requirements.

Figure 7:
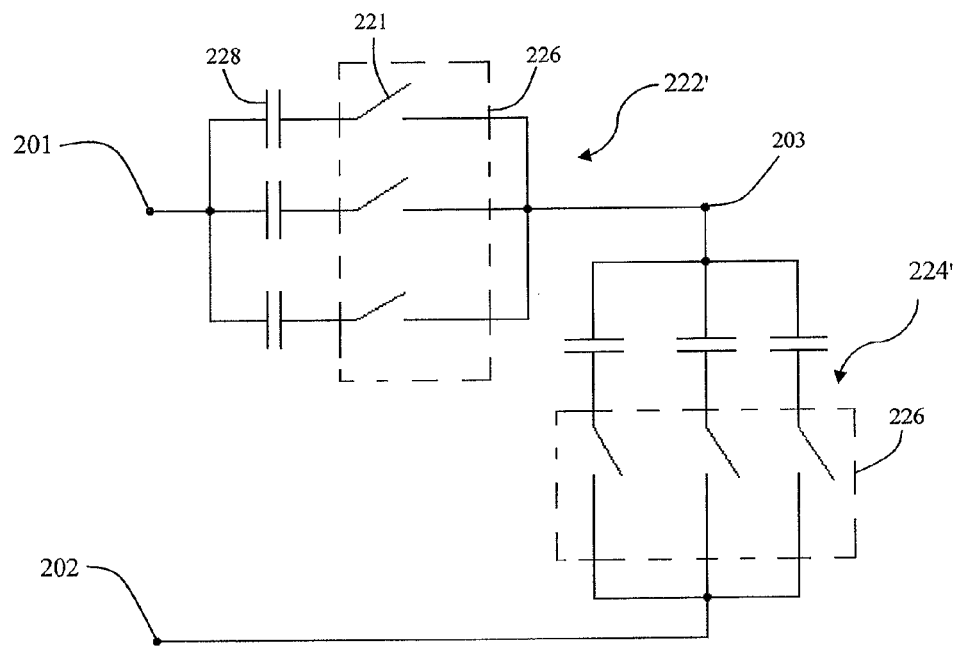

Referring to FIG. 7, a voltage decreasing unit 220 in accordance with a fifth embodiment comprises a first adjustable capacitor unit 222' which is electrically connected between the input terminal 201 and the output terminal 203 and a second adjustable capacitor unit 224' which is electrically connected between the output terminal 203 and the earth terminal 202. Each of the first and second adjustable capacitor units 222', 224' comprises at least one switching capacitor.

Figure 8:
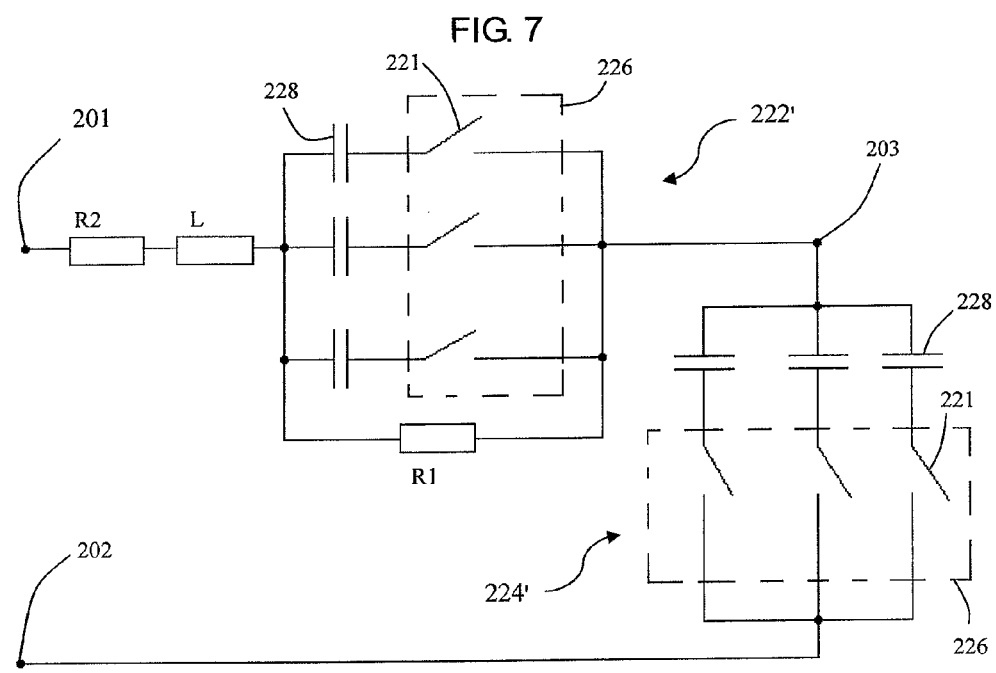

Compared with the voltage decreasing unit shown in FIG. 7, the voltage decreasing unit 220 in accordance with a sixth embodiment, as shown in FIG. 8, further comprises a resistor R1 which is electrically connected in parallel with the first adjustable capacitor unit 222' for discharging the adjustable capacitor unit after the AC power supply 206 is electrically disconnected from the voltage decreasing unit. A resistor R2 and an inductor L are electrically connected in series with the first adjustable capacitor unit 222' for limiting the possible surge current to protect electronic components from damage. It should be understood that in different applications the voltage decreasing unit 220 could include any one, any two or all three of the resistors R1, R2 and the inductor L, depending on practical requirements.

Figure 9:
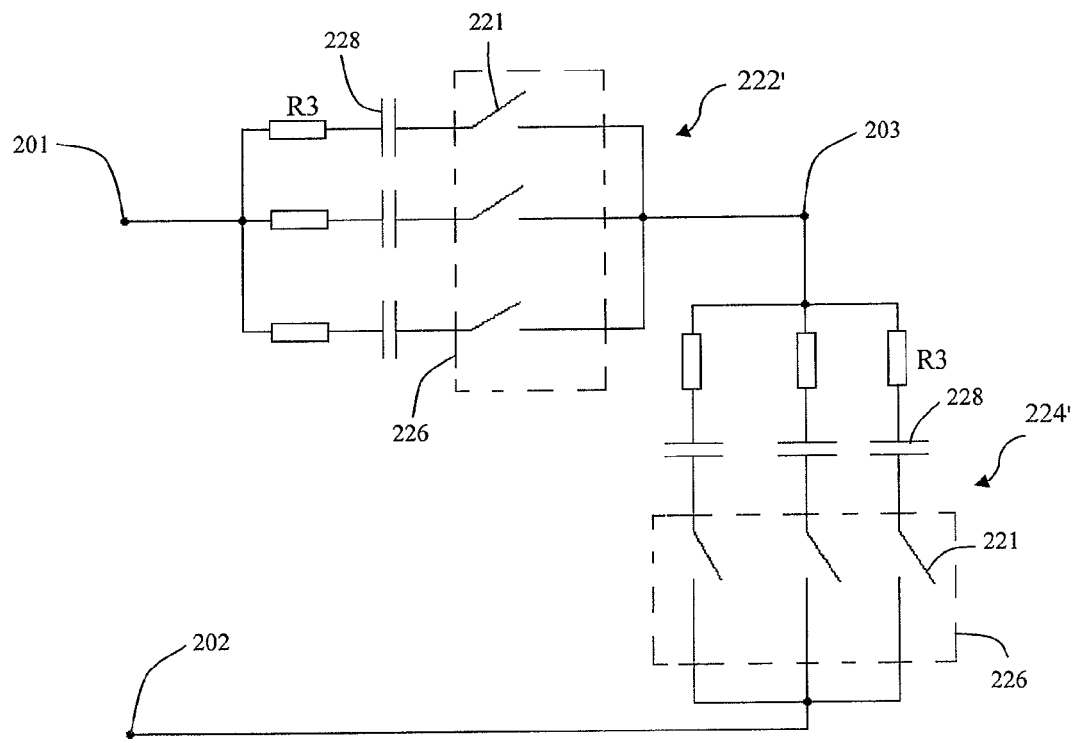

Compared with the voltage decreasing unit shown in FIG. 7, in a seventh embodiment shown in FIG. 9, a resistor R3 is respectively electrically connected in series with each fixed capacitor 228 of the first adjustable capacitor unit 222' and/or second adjustable capacitor unit 224', to limit the possible surge current and make the output of the voltage decreasing unit 220 more accurate. It should be understood that a resistor R1 electrically connected in parallel with the first adjustable capacitor unit 222' and/or an inductor L electrically connected in series with the first adjustable capacitor unit 222' could also be arranged in the voltage decreasing unit, depending on practical requirements.

Figure 10:
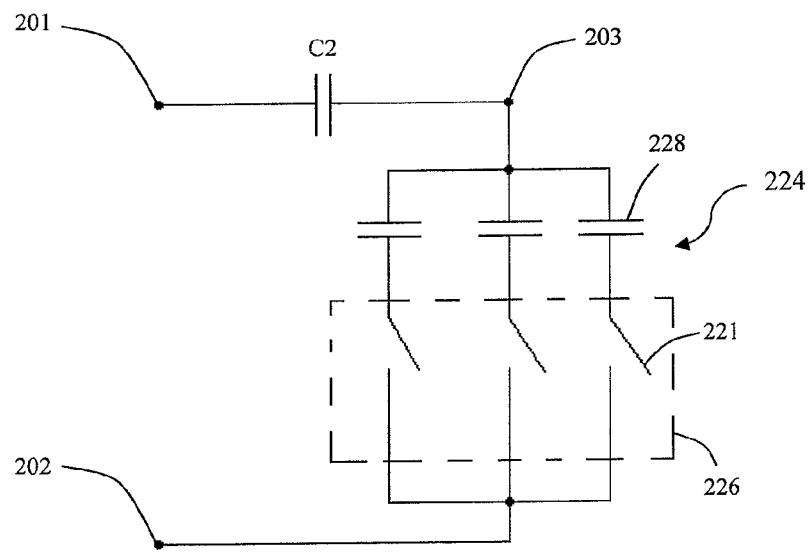

Referring to FIG. 10, in an eighth embodiment of the present invention, the voltage decreasing unit 220 comprises a fixed capacitor C2 electrically connected between the input terminal 201 and the output terminal 203 and an adjustable capacitor unit 224 electrically connected between the output terminal 203 and the earth terminal 202. The adjustable capacitor unit 224 comprises at least one switching capacitor with a fixed capacitor 228 and a switch 221. Preferably, a single resistor electrically connected in series with the switch 221 or a number of resistors respectively connected in series with each switching capacitor can be arranged.

In the embodiments of the present invention, the A-D converter 240, the driving unit 260, the over-voltage protection unit 290 and the low voltage generating unit 280 can be arranged on a printed circuit board, and the adjustable capacitor unit can be mechanically independent from the printed circuit board but electrically connected with the printed circuit board.

The motor device is particularly suitable for driving fans of ventilating devices, air blowers and air conditioners.

Although the invention is described with reference to one or more preferred embodiments, it should be appreciated by those skilled in the art that various modifications are possible. Therefore, the scope of the invention is to be determined by reference to the claims that follow.

For example, the motor could be another kind of DC motor such as a two phase or three phase BLDC motor, a universal motor, a stepper motor, a servo motor or an AC motor, such as a shaded-pole motor, induction motor or universal motor, which is able to be directly powered by the decreased AC voltage output from the voltage decreasing unit.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A power supply circuit comprising:
an input terminal for electrically connecting to an active wire of an AC power supply;
an earth terminal for electrically connecting to a neutral or ground wire of the AC power supply;
an output terminal for outputting a decreased AC voltage compared with the AC power supply; and
a voltage decreasing unit comprising a first adjustable capacitor unit having a first terminal couple to the input terminal and a second terminal coupled to the output terminal, the first adjustable capacitor unit including a plurality of switchable capacitors coupled in parallel with each other between the first terminal and the second terminal, a switchable capacitor of the plurality of switchable capacitors including a capacitor and a switch coupled in series with the capacitor between the first terminal and the second terminal.

2. The power supply circuit of claim 1, wherein the voltage decreasing unit further comprises a fixed capacitor electrically connected between the output terminal and the earth terminal.

3. The power supply circuit of claim 1, wherein the voltage decreasing unit further comprises a second adjustable capacitor unit having a first terminal coupled to the output terminal and a second terminal coupled to the earth terminal, the second adjustable capacitor unit including a plurality of switchable capacitors coupled in parallel with each other between the first terminal and the second terminal, each of the plurality of switchable capacitors including a capacitor and a switch coupled in series with the capacitor between the first terminal and the second terminal.

4. The power supply circuit of claim 1, wherein the switchable capacitor in the first adjustable capacitor unit further comprises a resistor coupled in series with the capacitor and the switch between the first terminal and the second terminal.

5. The power supply circuit of claim 1, wherein the voltage decreasing unit further comprises a coupled connected in parallel with the first adjustable capacitor unit.

6. The power supply circuit of claim 1, wherein the voltage decreasing unit further comprises a resistor and/or an inductor electrically connected in series with the first adjustable capacitor unit.

7. A motor device comprising a motor and a power supply circuit for powering the motor, the power supply circuit comprising:
an input terminal for electrically connecting to an active wire of an AC power supply;
an earth terminal for electrically connecting to a ground or neutral wire of the AC power supply;
an output terminal for outputting a decreased AC voltage compared with the AC power supply for powering the motor; and
a voltage decreasing unit comprising a first adjustable capacitor unit having a first terminal coupled to the input terminal and a second terminal coupled to the output terminal, the first adjustable capacitor unit including a plurality of switchable capacitors coupled in parallel with each other between the first terminal and the second terminal, a switchable capacitor of the plurality of switchable capacitors including a capacitor and a switch coupled in series with the capacitor between the first terminal and the second terminal.

8. The motor device of claim 7, wherein the adjustable capacitor unit is electrically connected between the input terminal and the output terminal.

9. The motor device of claim 7, wherein the motor is an AC motor powered by the decreased AC voltage from the output terminal.

10. The motor device of claim 7, wherein the motor is a DC motor, and the power supply circuit further comprises an A-D converter connected between the output terminal of the voltage decreasing unit and the motor for converting the decreased AC voltage of the output terminal to a DC voltage.

11. The motor device of claim 10, wherein the A-D converter is arranged on a printed circuit board, and the voltage decreasing unit is electrically connected with the printed circuit board but mechanically independent from the printed circuit board.

12. A power supply circuit for stator windings of a motor, comprising:
- an input terminal for electrically connecting to an active wire of an AC power supply;
- an earth terminal for electrically connecting to a neutral or ground wire of the AC power supply;
- an output terminal for outputting a decreased AC voltage compared with the AC power supply; and
- a voltage decreasing unit comprising:
    - a capacitor coupled between the input terminal and the output terminal; and
    - a adjustable capacitor unit having a first terminal coupled to the output terminal and a second terminal coupled to the earth terminal, the adjustable capacitor unit including a plurality of switchable capacitors coupled in parallel with each other between the first terminal and the second terminal, a switchable capacitor of the plurality of switchable capacitors including a capacitor and a switch coupled in series with the capacitor between the first terminal and the second terminal.

* * * * *